March 11, 1930.    H. K. JONES ET AL    1,750,520
CHANGE OVER SIGNAL FOR MOTION PICTURE MACHINES
Original Filed June 8, 1928    2 Sheets-Sheet 1
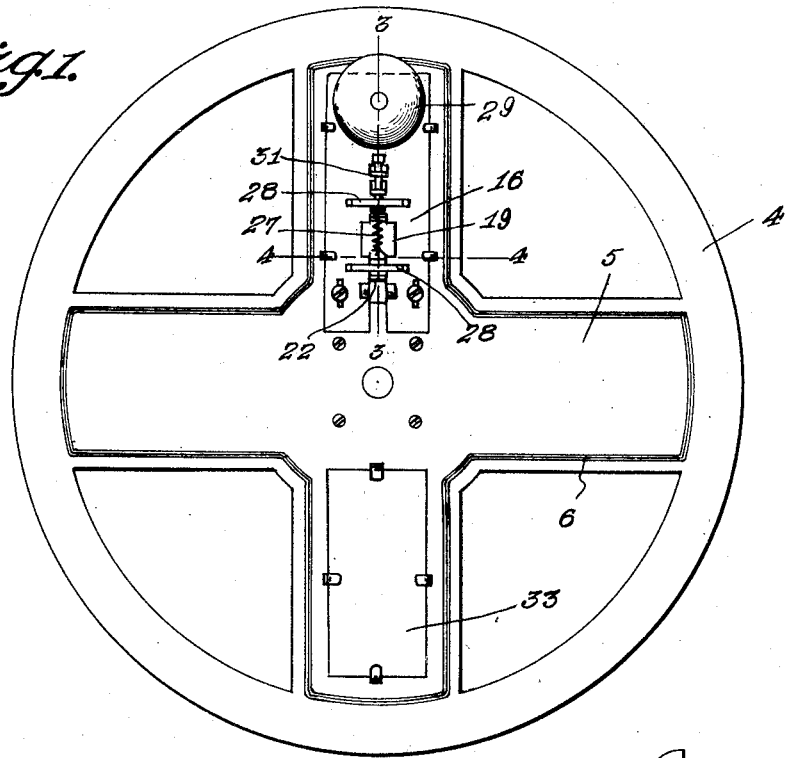
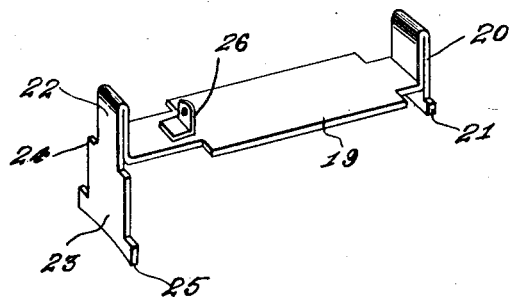
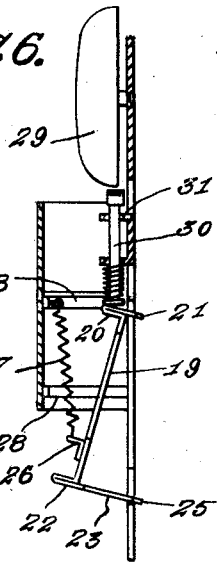
Heber K. Jones,
Edmund A. Chase,
INVENTOR
BY Victor J. Evans
ATTORNEY March 11, 1930.    H. K. JONES ET AL    1,750,520
CHANGE OVER SIGNAL FOR MOTION PICTURE MACHINES
Original Filed June 8, 1928    2 Sheets-Sheet 2
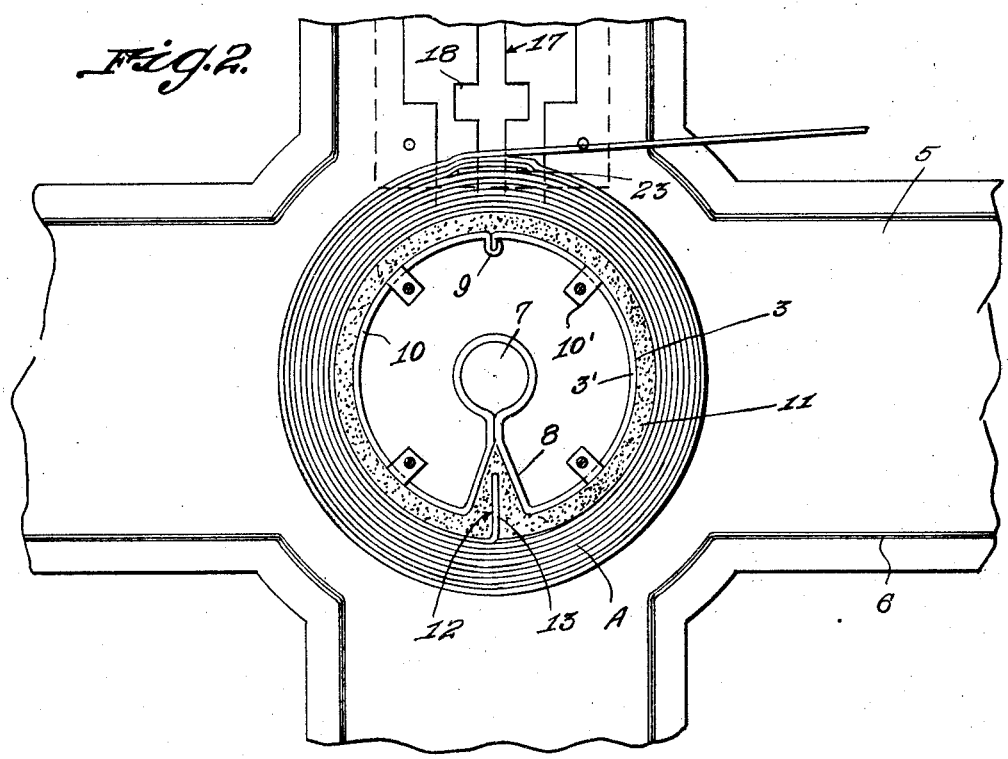
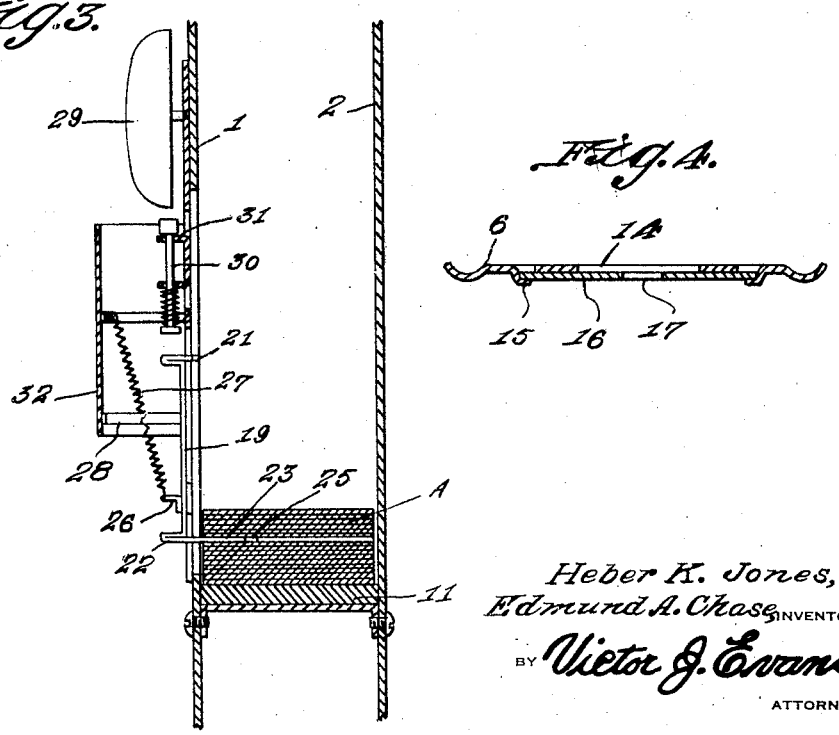
Heber K. Jones,
Edmund A. Chase, INVENTOR
BY Victor J. Evans
ATTORNEY Patented Mar. 11, 1930

1,750,520

UNITED STATES PATENT OFFICE

HEBER K. JONES AND EDMUND A. CHASE, OF ST. JOHN, NEW BRUNSWICK, CANADA

CHANGE-OVER SIGNAL FOR MOTION-PICTURE MACHINES

Application filed June 8, 1928, Serial No. 283,931. Renewed August 7, 1929.

This invention relates to a change-over signal for motion picture machines, the general object of the invention being to provide means for operating a signal when the film has passed through one projector to a point where it is necessary to stop the operation of this projector and start up the other projector so that the operator will know that he must change over from one machine to the other.

Another object of the invention is to so construct the reel that the signal can be attached thereto.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a face view of a reel, showing the invention thereon.

Figure 2 is a vertical sectional view through the hub of the wheel, showing the invention in use.

Figure 3 is a section on line 3—3 of Figure 1.

Figure 4 is a section on line 4—4 of Figure 1.

Figure 5 is a view of the trigger member.

Figure 6 is a sectional view through the signal means.

In these views, the numerals 1 and 2 indicate the disks of the reel and 3 indicates the hub thereof. Each disk is formed of sheet metal or the like, cut and shaped to form the ring part 4 and the spokes 5, the edges of the spokes being formed with grooves and ribs to strengthen them, as shown at 6 in Figure 4. The hub is formed of a strip 3' bent into circular shape at its center to form the opening 7 which receives the supporting spindle and then the strip is bent to form the divergent parts 8 and then the strip is bent into circular form with its ends crimped together, as at 9, to form the film carrying part 10.

A rim 11 of rubber or the like is pressed upon the part 10 with a portion thereof entering the recess formed by the divergent parts 8, this portion of the rim being formed with a slot 12 to receive the end 13 of the film A. The part 10 of the strip is provided with the lugs 10' which are fastened to the central portions of the disks. Thus a reel of great strength is produced.

One of the spokes of the disk 1 is formed with an opening 14 and ears 15 are punched from the spoke adjacent the sides of the opening and a plate 16 is fastened to the spoke over the opening by these ears. This plate is formed with a longitudinally extending slot 17, with notches 18 in its walls adjacent the inner end of the slot. A trigger member 19 is slidably arranged on the plate and has its outer end bent to form a striker piece 20 and a key-shaped piece 21, the latter piece passing through the slot and acting to slidably hold the trigger member on the plate. The opposite end of the member 19 is also bent at right angles, the outer portion of the bent part forming a finger piece 22 and the inner portion 23 which passes through the slot being engaged by the film wound upon the reel. The finger piece is of less width than the part 23 to provide the shoulders 24 which engage the inner face of the plate adjacent the slot and the major portion of the part 23 is of such a width as to permit this portion to pass through the notched part of the slot when the member 19 is in its outward position. Extensions 25 on the inner end of the part 23 prevent said part from entirely passing through the notched part of the slot.

An ear 26 is placed on the outer face of the member 19 and a spring 27 has one end connected with this ear and its other end is connected to the upper one of a pair of yokes 28 fastened to the outer face of the plate 16, this spring tending to hold the member 19 in its outer position. A bell 29 is fastened to the outer end of the plate 16 and a spring pressed plunger 30 is slidably mounted in the guides 31 struck up from the plate, this plunger being so arranged that its inner end will be struck by the striker part 20 of the member 19 when the same is pulled outwardly by the spring 27 so that the outer end of the plunger will be caused to strike the bell and thus sound an alarm.

The inner end of the film is placed in the slot 12 of the hub of the reel and then the film is wrapped around the resilient part 11 of the hub to the point where the change-over is to take place. The member 19 is then moved inwardly to the inner end of the plate, by placing the finger on the finger piece 22 until the part 23, which is slightly curved, engages the film. Then the rest of the film is wound upon the reel and as the film rests on the part 23, the member 19 will be held in projected position against the action of its spring 27. The reel is then placed in the projecting apparatus and the apparatus started to project the picture. As that portion of the film where the change-over is to take place leaves the reel, the part 23 will be released so that the spring can pull the member 19 outwardly, thus causing the striker part 20 to strike the plunger and sound the alarm to notify the operator that the change-over must be made.

When the part 23 reaches a point where it is opposite the notched part of the slot, the spring will pull said part 23 through the notches so that said part will be out of the way when the first part of the film is being wound from the reel or wound thereon.

A cover 32 is placed over the yoke members 28 to enclose the parts and a plate 33 is fastened to that spoke of the disk 1 which is opposite the one which carries the plate 16 so that the plate 33 acts as a counterbalance for the plate 16 and its attached parts.

It is thought from the foregoing description that the advantages and novel features of our invention will be readily apparent.

It is to be understood that we may make changes in the construction and in the combination and arrangement of the several parts, provided that such changes fall within the scope of the appended claims.

What we claim is:—

1. A reel for a motion picture apparatus comprising a pair of disks, a hub part connected with the central parts of the disks, a member of resilient material surrounding the hub part and having a slot therein for receiving the inner end of the film placed on the reel.

2. In combination with a reel of a motion picture apparatus, a supporting plate attached to a part of the reel, an alarm carried by the plate, a spring pressed hammer on the plate, said plate having a slot therein, a member having inwardly projecting portions passing through the slot for slidably connecting the member with the plate, the inner projecting portion being extended whereby it can be placed between some of the convolutions of the film on the reel to hold the member away from the hammer and a spring attached to the member for pulling the member against the hammer when the projecting portion is freed of the film.

In testimony whereof we affix our signatures.

HEBER K. JONES.
EDMUND A. CHASE.